(12) United States Patent
Yun et al.

(10) Patent No.: US 9,411,497 B2
(45) Date of Patent: Aug. 9, 2016

(54) METHOD FOR PROVIDING GRAPHICAL USER INTERFACE FOR CHANGING REPRODUCING TIME POINT AND IMAGING APPARATUS THEREFOR

(71) Applicant: SAMSUNG ELECTRONICS CO., LTD., Gyeonggi-do (KR)

(72) Inventors: Young-hwa Yun, Seoul (KR); Seong-ick Jon, Seoul (KR); Joon-hwan Kim, Yongin-si (KR); Jeong-yeon Lee, Seongnam-si (KR); Woo-seok Hwang, Seoul (KR); Hyun-kyu Yun, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 113 days.

(21) Appl. No.: 14/324,634

(22) Filed: Jul. 7, 2014

(65) Prior Publication Data
US 2014/0325358 A1    Oct. 30, 2014

Related U.S. Application Data

(63) Continuation of application No. 11/837,827, filed on Aug. 13, 2007, now Pat. No. 8,875,022.

(30) Foreign Application Priority Data

Jan. 26, 2007 (KR) .................. 10-2007-0008530

(51) Int. Cl.
*G06F 3/00* (2006.01)
*G06F 3/0484* (2013.01)
(Continued)

(52) U.S. Cl.
CPC .......... *G06F 3/04842* (2013.01); *G06F 3/0481* (2013.01); *G06F 3/0482* (2013.01);
(Continued)

(58) Field of Classification Search
CPC . G06F 3/04842; G06F 3/0481; G06F 3/0482; G11B 19/025; G11B 27/105; G11B 27/34
See application file for complete search history.

(56) References Cited

U.S. PATENT DOCUMENTS 5,195,179 A    3/1993   Tokunaga
5,852,435 A   12/1998   Vigneaux et al.
(Continued)

FOREIGN PATENT DOCUMENTS

CN        1637923 A        7/2005
JP     2000-125239 A       4/2000
(Continued)

OTHER PUBLICATIONS

Chinese Office Action issued on Jan. 18, 2011 in the corresponding Chinese Patent Application No. 200710186960.1.
(Continued)

*Primary Examiner* — Nicholas Augustine
(74) *Attorney, Agent, or Firm* — Sughrue Mion, PLLC (57) ABSTRACT

A method for providing a Graphical User Interface (GUI) for changing a reproducing time point, and an imaging apparatus incorporating the same are provided. The GUI for changing a reproducing time point displays reduction images of specific time points within a time period including a specific time point selected by a pointer, and changes the reproducing time point to the time point represented by the reduction image selected from the displayed reduction images. Accordingly, a user is able to search for a desired time point without going through a plurality of manipulations to change the reproducing time point on the progress bar using the pointer.

16 Claims, 8 Drawing Sheets

(51) Int. Cl.

| | | |
|---|---|---|
| *G06F 3/0481* | (2013.01) | |
| *G11B 27/10* | (2006.01) | |
| *G11B 27/34* | (2006.01) | |
| *H04N 5/445* | (2011.01) | |
| *H04N 5/76* | (2006.01) | |
| *H04N 21/431* | (2011.01) | |
| *H04N 21/4402* | (2011.01) | |
| *H04N 21/472* | (2011.01) | |
| *H04N 21/81* | (2011.01) | |
| *H04N 21/845* | (2011.01) | |
| *G06F 3/0482* | (2013.01) | |
| *G11B 19/02* | (2006.01) | |
| *G06F 3/01* | (2006.01) | |
| *H04N 5/781* | (2006.01) | |
| *H04N 21/422* | (2011.01) | |

(52) U.S. Cl.
CPC ............ *G11B19/025* (2013.01); *G11B 27/105* (2013.01); *G11B 27/34* (2013.01); *H04N 5/44591* (2013.01); *H04N 5/76* (2013.01); *H04N 21/4316* (2013.01); *H04N 21/440263* (2013.01); *H04N 21/440281* (2013.01); *H04N 21/47217* (2013.01); *H04N 21/8153* (2013.01); *H04N 21/8455* (2013.01); *H04N 5/781* (2013.01); *H04N 21/42222* (2013.01)

(56) References Cited

U.S. PATENT DOCUMENTS

| | | | |
|---|---|---|---|
| 5,884,056 | A | 3/1999 | Steele |
| 6,069,606 | A | 5/2000 | Sciammarella et al. |
| 6,332,147 | B1 | 12/2001 | Moran et al. |
| RE38,401 | E | 1/2004 | Goldberg et al. |
| RE38,609 | E | 10/2004 | Chen et al. |
| 6,807,361 | B1 | 10/2004 | Girgensohn et al. |
| 7,149,974 | B2 | 12/2006 | Girgensohn et al. |
| 7,343,026 | B2 | 3/2008 | Niwa et al. |
| 7,434,155 | B2 | 10/2008 | Lee |
| 7,818,658 | B2 | 10/2010 | Chen |
| 7,830,570 | B2 | 11/2010 | Morita et al. |
| 7,929,823 | B2 | 4/2011 | Roh |
| 8,108,535 | B1 | 1/2012 | Roberts et al. |
| 8,209,623 | B2 | 6/2012 | Barletta et al. |
| 2002/0075572 | A1 | 6/2002 | Boreczky et al. |
| 2004/0090462 | A1 | 5/2004 | Graham |
| 2004/0095396 | A1 | 5/2004 | Stavely et al. |
| 2004/0128317 | A1 | 7/2004 | Sull et al. |
| 2005/0147389 | A1 | 7/2005 | Nakamura et al. |
| 2005/0162384 | A1 | 7/2005 | Yokoyama |
| 2005/0210388 | A1 | 9/2005 | Matsumoto |
| 2006/0090141 | A1 | 4/2006 | Loui et al. |
| 2006/0103631 | A1 | 5/2006 | Mashima et al. |
| 2006/0120624 | A1 | 6/2006 | Jojic et al. |
| 2006/0184966 | A1 | 8/2006 | Hunleth et al. |
| 2006/0224940 | A1 | 10/2006 | Lee |
| 2006/0252541 | A1 | 11/2006 | Zalewski et al. |
| 2006/0277454 | A1 | 12/2006 | Chen |
| 2006/0285818 | A1 | 12/2006 | Murabayashi |
| 2007/0071413 | A1 | 3/2007 | Takahashi |
| 2007/0110399 | A1 | 5/2007 | Roh |
| 2007/0168413 | A1 | 7/2007 | Barletta et al. |
| 2008/0096654 | A1 | 4/2008 | Mondesir et al. |
| 2009/0164933 | A1 | 6/2009 | Pederson et al. |

FOREIGN PATENT DOCUMENTS

| | | |
|---|---|---|
| KR | 10-2003-0056546 A | 7/2003 |
| WO | 92/09983 A1 | 6/1992 |
| WO | 2005/036875 A1 | 4/2015 |

OTHER PUBLICATIONS

Communication, dated Jun. 5, 2013, issued by the State Intellectual Property Office of P.R. China in counterpart Chinese Patent Application No. 200710186960.1.

Communication, dated May 31, 2013, issued by the Korean Intellectual Property Office in counterpart Korean Patent Application No. 10-2007-0008530.

Communication dated Mar. 27, 2015, issued by the European Patent Office in counterpart European Application No. 07114748.2.

Anonymous, "Wii Remote—Wikipedia, the free encyclopedia", Jan. 25, 2007, 10 pages total, XP 055177622, URL: http://en.wikipedia.org/w/index.php?title=wii_Remote&oldid=103216339.

Communication dated Apr. 5, 2016, issued by the European Patent Office in counterpart European Application No. 07114748.2.

METHOD FOR PROVIDING GRAPHICAL USER INTERFACE FOR CHANGING REPRODUCING TIME POINT AND IMAGING APPARATUS THEREFOR

CROSS-REFERENCE TO RELATED APPLICATIONS

This is a continuation of U.S. application Ser. No. 11/837,827 filed Aug. 13, 2007, which application claims priority from Korean Patent Application No. 10-2007-0008530, filed Jan. 26, 2007, in the Korean Intellectual Property Office, the entire disclosures of which are hereby incorporated by reference.

BACKGROUND

1. Field of the Invention

Methods and apparatuses consistent with the present invention relate to providing a Graphical User Interface (GUI) for changing a reproducing time point, and more particularly, to providing GUI for changing a current reproducing time point and an image apparatus incorporating the same.

2. Description of the Related Art

A progress bar is widely used to represent a current reproducing time point while a moving image is reproduced. The progress bar represents the length of whole moving image in a bar form, and represents the current reproducing time point by moving the bar.

If a reproducing time point that is different from the current reproducing time point is selected on the progress bar, then the current reproducing time point is changed to the selected time point. The different time point on the progress bar is selected by inputting a pointer. In doing so, the progress bar changes the reproducing time point faster than a fast forward (FF) operation or a rewind (REW) operation.

Unlike the FF or the REW operations, which change the reproducing time point in real time, the progress bar only displays an image of the changed time point. Accordingly, it is impossible to locate the desired time point by changing the reproducing time point once, and a user usually locates the desired time point after numerous trials and errors.

Accordingly, the user has to go through a plurality of manipulations to change the reproducing time point using the pointer on the progress bar. Further, the longer the length of the moving image, the more the user is inconvenienced.

SUMMARY OF THE INVENTION

Accordingly, aspects of the present invention address at least the above problems. Also, the present invention is not required to overcome the problems described above, and an exemplary embodiment of the present invention may not overcome any of the problems described above.

An aspect of the present invention provides a method for providing a GUI for changing a reproducing time point to display reduction images of time points within a time period comprising the time point selected by a pointer, and for changing the reproducing time point to the time point represented by the reduction image selected from the displayed reduction images, and an image apparatus incorporating the same.

A method for providing a Graphical User Interface (GUI) for changing a reproducing time point may comprise: generating a reproducing time point guiding graphic which indicates a current reproducing time point and a pointer, and combining the generated reproducing time point guiding graphic and the pointer with a displayed image; if a specific time point is selected from the reproducing time point guiding graphic by the pointer, combining reduction images of time points within a specific time period comprising the selected time point with the displayed image; and if one of the reduction images is selected, changing the current reproducing time point into the time point represented by the selected reduction image.

The method for providing a GUI for changing reproducing time point may further comprise combining a connection line visually connecting the specific time point displayed on the reproducing time point guiding graphic and the reduction images with the displayed image.

The length of the specific time period may be in proportion to the whole length of moving image being reproduced.

The method for providing a GUI for changing reproducing time point may further comprise: generating reduction images of time points different from the time points represented by the reduction images combined with the displayed image, and combining the generated reduction images with the displayed image.

The different time points may comprise one of reduction images prior to or following the reduction images combined with the displayed image.

The specific time point may be positioned at one of the beginning, middle, or ending of the time period.

The pointer may be moved in a space by two-dimensional movement of a remote control apparatus by a user.

The pointer moves to the same direction as the face of the remote control is moved on a virtual plane which is parallel with a screen of a display.

According to another aspect of the present invention, there is provided an image apparatus comprising: a Graphical User Interface (GUI) generator which generates a GUI and combines the generated GUI with an image to be displayed; and a controller which controls the GUI generator to generate a reproducing time point guiding graphic which indicates a current reproducing time point and a pointer and to combine with a displayed image, which controls the GUI generator to combine reduction images of time points within a specific time period comprising the specific time point with the displayed image, if a specific time point is selected from the reproducing time point guiding graphic by the pointer, and which changes the current reproducing time point into the time point represented by selected reduction image, if one of the reduction images is selected.

The controller may control the GUI generator to combine a connection line visually connecting the specific time point displayed on the reproducing time point guiding graphic and the reduction images with the displayed image.

The length of specific time period may be in proportion to the whole length of moving image being reproduced.

The controller may control the GUI generator to generate reduction images of time points different from the time points represented by the reduction images combined with the displayed image, and to combine the generated reduction images with the displayed image.

The different time points may be one of reduction images prior to or following the reduction images combined with the displayed image.

The specific time point may be positioned at one of the beginning, middle, or ending of the specific time period.

The pointer may be moved in a space by two-dimensional movement of a remote control apparatus by a user.

The pointer may move to the same direction as the face of the remote control is moved on a virtual plane which is parallel with a screen of a display.

The image apparatus may further comprise a display which displays the reproducing time point guiding graphic, the pointer, the reduction images, and the image.

BRIEF DESCRIPTION OF THE DRAWINGS

The above aspects and other aspects of the present invention will become apparent and more readily appreciated from the following description of the exemplary embodiments, taken in conjunction with the accompany drawings, in which.

DETAILED DESCRIPTION OF EXEMPLARY EMBODIMENTS

Certain exemplary embodiments of the present invention will be described in greater detail with reference to the accompanying drawings.

Figure 1A:
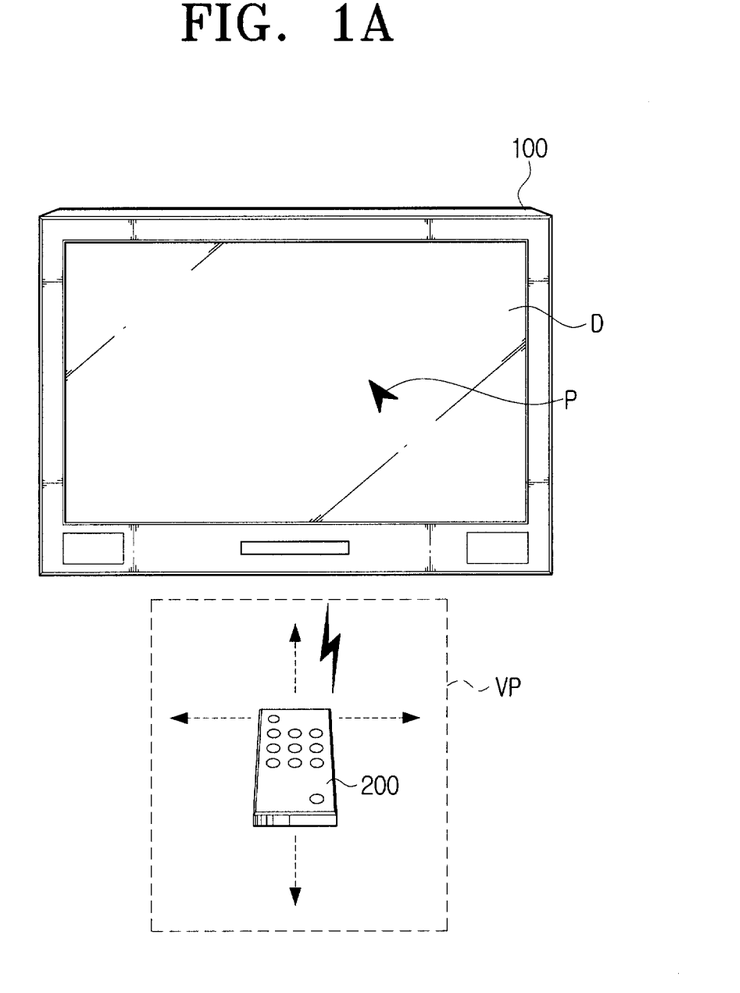
FIGS. 1A, 1B and 1C are views illustrating a broadcast receiving system according to an exemplary embodiment of the present invention.

FIG. 1A is a view illustrating a broadcast receiving system according to an exemplary embodiment of the present invention. Referring to FIG. 1A, a broadcast receiving system comprises a digital television (DTV) 100 as a broadcast receiving apparatus and a remote control 200 as a user input apparatus (remote control apparatus).

The DTV 100 provides a user with a broadcast received over wire or wirelessly, through a display D. A pointer P is displayed on the display D. Additionally, the DTV 100 may provide a user with an external input received from an external apparatus which is connected over wire or wirelessly, through the display D, and may also provide a user with a broadcast by reproducing a file, such as a moving image file, a still image file, a music file, etc., stored in a built-in storage media.

The remote control 200 sends information regarding the manipulation of the user to the DTV 100, and the DTV 100 operates according to the received information. Although the remote control 200 of FIG. 1A includes a plurality of keys, the remote control 200 may include either one or two keys as occasion demands. A plurality of keys are provided on the top side of the remote control 200, but the plurality of keys may be provided on the other sides such as the left or right side, or the bottom.

As indicated by dotted arrows in FIG. 1A, the face of the remote control 200 may be moved in a space by the user in an upwards or downwards direction, or to the left or right, or in a direction combining two of these directions, such as an upper-leftwards direction, for instance. That is, the face of the remote control 200 may be moved in any direction.

Figure 1B:
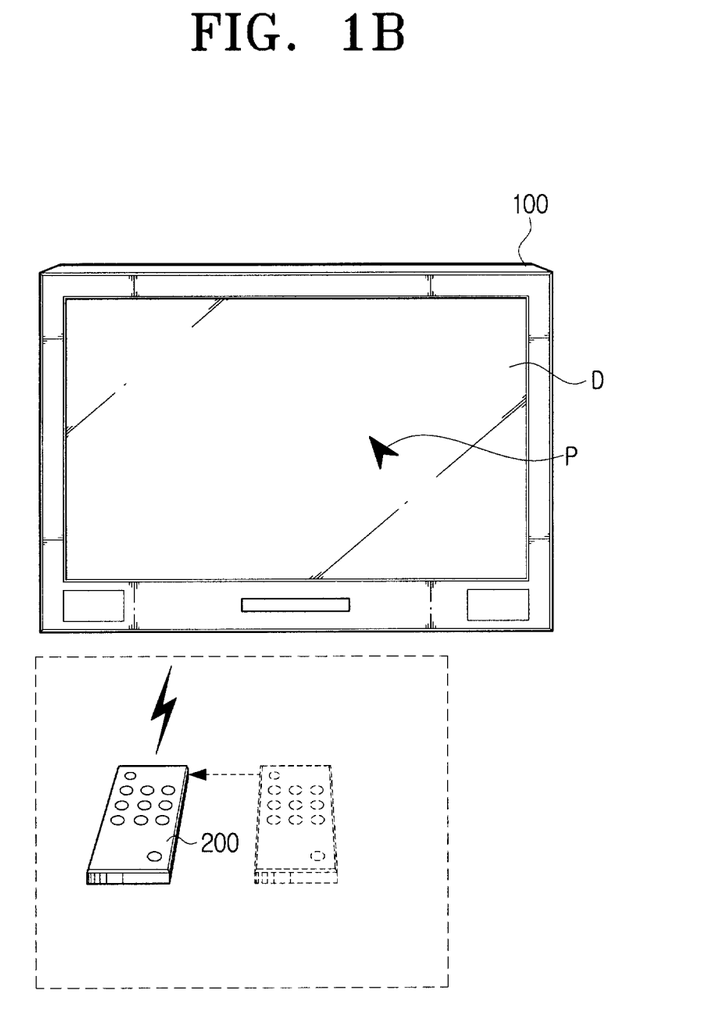

For example, the face of the remote control 200 may be moved while drawing a locus on a virtual plane (VP) which is in a parallel relation with a screen of the display D. FIG. 1B is a view illustrating a case in which the face of the remote control 200 is moved to the left direction while drawing a locus on a virtual plane which is in a parallel relation with the screen of the display D by the user.

The VP may not be in a perfect parallel relation with the screen of the display D, and may not be a perfect plane. That is, it is practically impossible for the movement of the face of the remote control 200 by the user to be on a perfect plane and in a perfect parallel relation with the screen of the display D.

Accordingly, the present invention may be applicable to the case in which the face of the remote control 200 moves on an imperfect plane and in an imperfect parallel relation with the screen of the display D.

A user may move the face of the remote control 200 by turning only the user's wrist while the user's arm holding the remote control 200 is fixed.

Figure 1C:
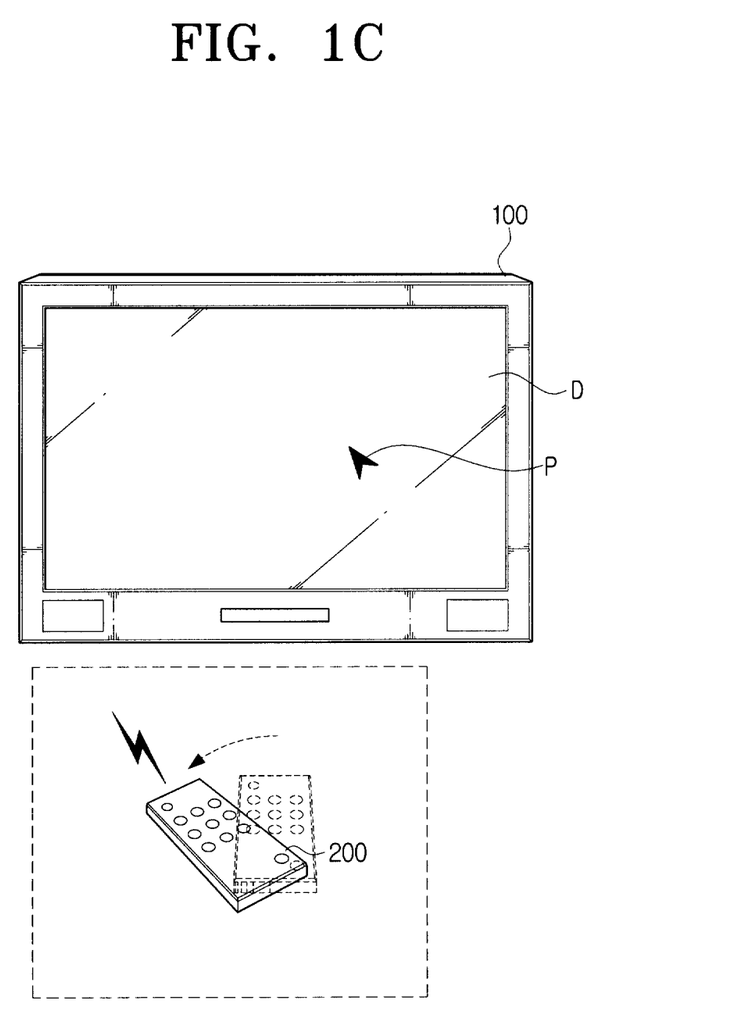

If only the user's wrist moves in an upwards or downwards direction, or to the left or right, or in a direction combining these, such as an upper leftward direction, the face of the remote control 200 may be moved upwards, downwards, or to the left or right, or in a direction combining any of these movements, such as an upper leftwards direction while drawing a curved locus on a virtual hemisphere surface. FIG. 1C is a view illustrating the case in which the face of the remote control 200 is moved to the left by a user while drawing a curved locus on a virtual hemisphere surface.

The virtual hemisphere surface, on which the face of the remote control 200 is moved by rotation of the user's wrist, may be a mathematically imperfect hemisphere surface. That is, it is practically impossible for the face of the remote control 200 to be moved by rotating the user's wrist while drawing a locus on a mathematically perfect hemisphere surface.

Accordingly, the present invention may be applicable to the case in which the face of the remote control 200 does not move on a mathematically perfect hemisphere, but moves on an imperfect hemisphere surface while drawing a curved locus.

Thus, the pointer P displayed on the display D may be moved by the user spatially moving the remote control 200. The spatial movement of the face of the remote control 200 is distinguished from the movement of a mouse for a personal computer (PC) which is moved over a surface.

When the face of the remote control 200 is moved in a space, the pointer P displayed on the display D moves in the same direction as the face of the remote control 200. For example, 1) if a user moves the face of the remote control 200 upwards within a space, then the pointer P may move upwards, and 2) if the user moves the face of the remote control 200 to the upper-left in a space, then the pointer P may move to the upper-left.

Figure 2:
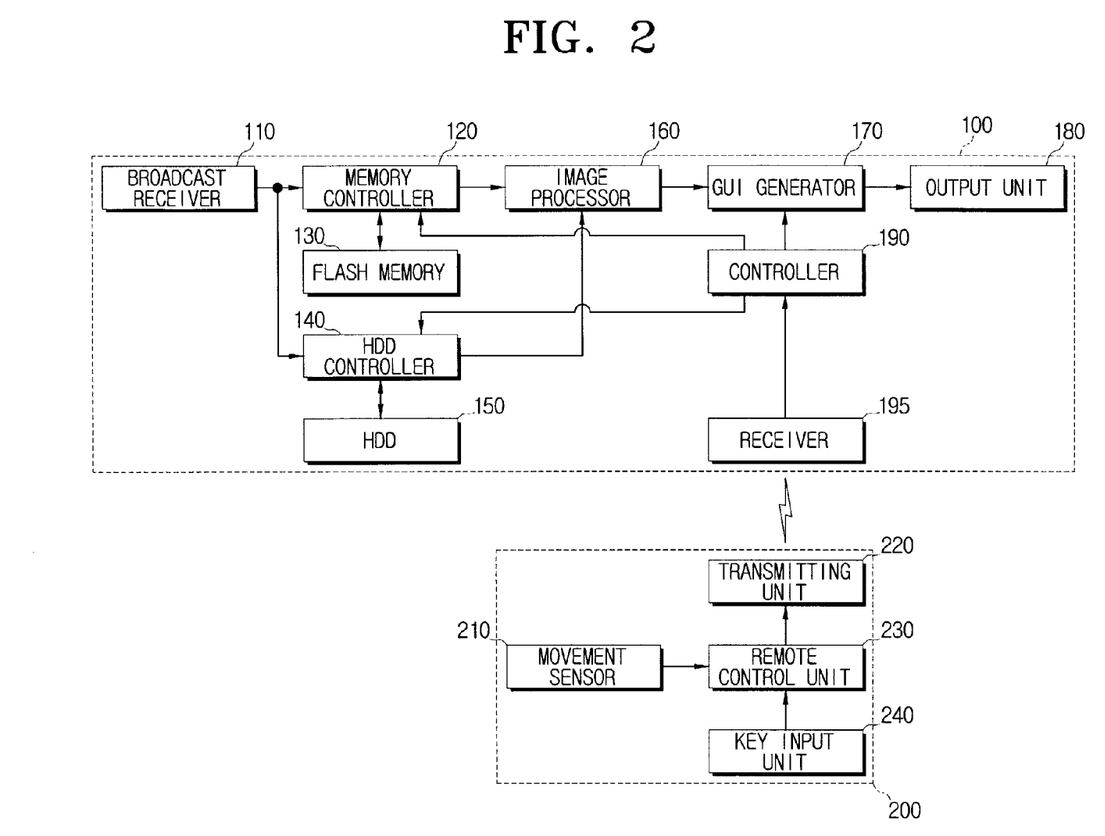
FIG. 2 is a block diagram of the TV and the remote control of FIG. 1.

Hereinafter, the TV 100 and the remote control 200 illustrated in FIG. 1 will be explained in detail with reference to FIG. 2. FIG. 2 is a block diagram of the TV 100 and the remote control 200 of FIG. 1.

Referring to FIG. 2, the remote control 200 comprises a movement sensor 210, a transmitting unit 220, a remote control unit 230, and a key input unit 240.

The movement sensor 210 senses the movement of the face of the remote control 200, and sends the result of such sensing to the remote control unit 230 which will be explained in detail below. An exemplary implementation may use a biaxial gyro sensor as the movement sensor 210.

The key input unit 240 may comprise a power key, a channel key, a volume key, a select key, and an option key.

The remote control unit 230 transmits information regarding movement such as a moving direction, a moving distance, etc., which is obtained from the sensing result transmitted from the movement sensor 210, to the TV 100 via the transmitting unit 220. The remote control unit 230 also sends the TV 100 information about keys inputted by the user through the transmitting unit 220.

Referring to FIG. 2, the TV 100 comprises a broadcast receiver 110, a memory controller 120, a flash memory 130, a hard disc device (HDD) controller 140, a hard disc device (HDD) 150, an image processor 160, a Graphic User Interface (GUI) generator 170, an output unit 180, a controller 190, and a receiver 195.

The broadcast receiver 110 receives a broadcast over wire or wirelessly from a broadcasting station or a satellite.

The memory controller 120 may store a broadcast, which is outputted from the broadcast receiver 110, at the flash memory 130. Also, the memory controller 120 may read the broadcast stored at the flash memory 130 and transmit the read broadcast to the image processor 160 to be explained below.

The flash memory 130 is a storage medium which temporarily stores a broadcast by the memory controller 120. A predetermined amount of broadcasts (for example, six-hours of broadcasts) may be stored at the flash memory 130 in a First in First out (FIFO) order.

The predetermined amount of broadcasts is stored at the flash memory 130 such that the TV 100 may provide a time-shifting function. The term 'time-shifting' refers to reproducing a broadcast which has been previously displayed on the screen. A user may watch a past broadcast by such time-shifting.

The HDD controller 140 may read the moving image file stored at the HDD 150 and transmit the read moving image file to the image processor 160 to be explained in detail below. Also, the HDD controller 140 may store the broadcast being received through the broadcast receiver 110 at the HDD 150 in the form of a moving image file, or may store the moving image file being inputted from the external apparatus through an external input terminal (not shown) at the HDD 150.

The image processor 160 executes image signal processing such as decoding, or scaling of the broadcast outputted from the memory controller 120 or the moving image outputted from the HDD controller 140.

The GUI generator 170 generates a GUI to display on the display D, and combines the GUI with the broadcast outputted from the image processor 160.

The output unit 180 may display the image combining the GUI outputted from the GUI generator 170 on the display D, or may output to an external display such as external TV connected through an external output terminal (not shown).

The controller 190 controls the overall operation of the TV according to the user's manipulation comprising movement of the face of the remote control 200, or a key input, which is transmitted from the remote control 200 to the receiver 195.

Figure 3:
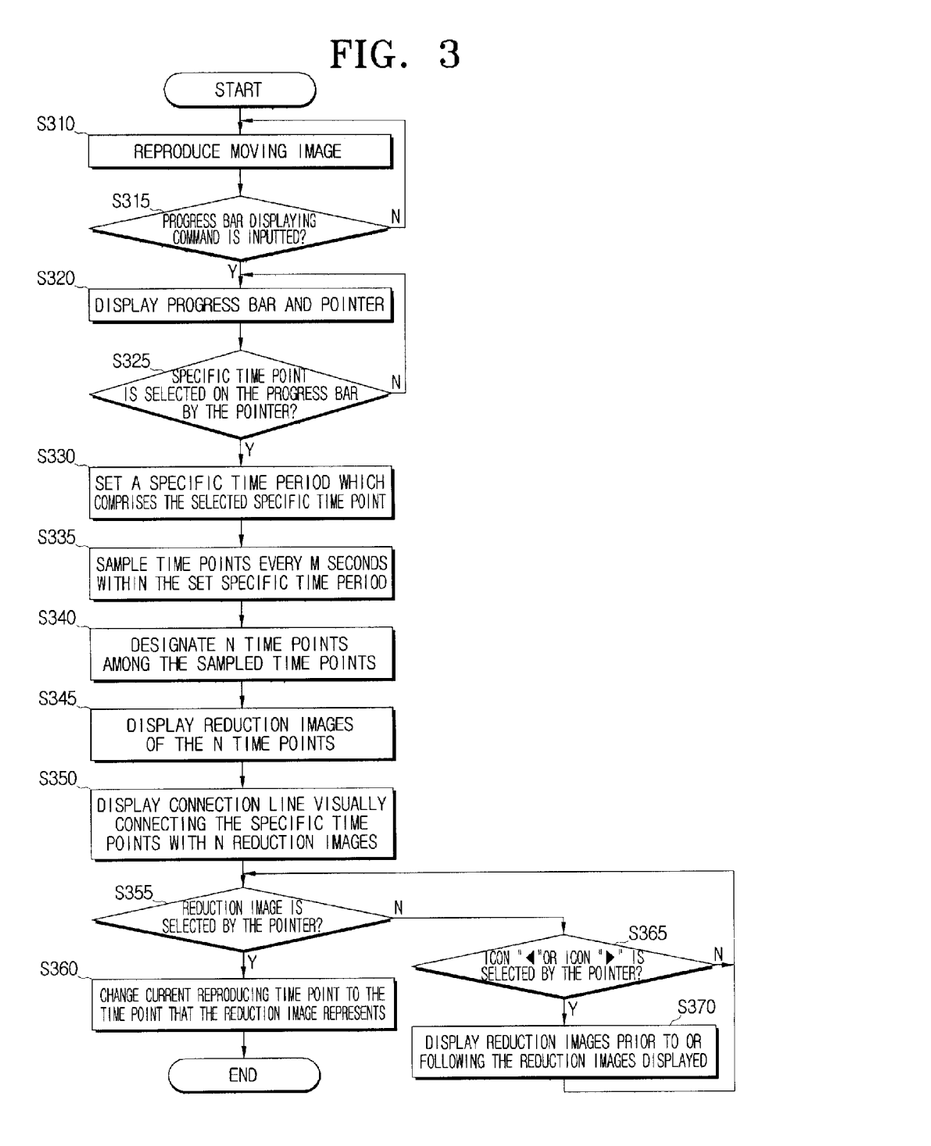
FIG. 3 is a flowchart illustrating a method for providing a GUI for changing a reproducing time point according to an exemplary embodiment of the present invention.

When the moving image file stored at the HDD 150 is reproduced, the controller 190 controls the GUI generator 170 to provide the GUI for changing a reproducing time point, and controls the HDD controller 140 to change the reproducing time point to a time point selected by the user using the GUI, which will be described in detail below with reference to FIG. 3. FIG. 3 is a flowchart illustrating a method for providing GUI for changing reproducing time point in accordance with an exemplary embodiment of the present invention.

Referring to FIG. 3, when a moving image file stored at the HDD 150 is reproduced (operation S310), if a progress bar displaying command is inputted (operation S315=Y), then the controller 190 controls such that a progress bar and a pointer P are displayed on the display D (operation S320).

Herein, the term progress bar refers to a guide graphic, which represents the length of a whole moving image in a bar form, and which indicates the current progress of a task by moving the reproducing time point.

The progress bar displaying command at operation S315 may be inputted by pressing a certain key such as option key on the key input unit 240, for example.

To execute operation S320, the controller 190 controls the GUI generator 170 to generate a progress bar and a pointer and to combine the generated progress bar and pointer P with a moving image to be displayed on the display D.

Figure 4A:
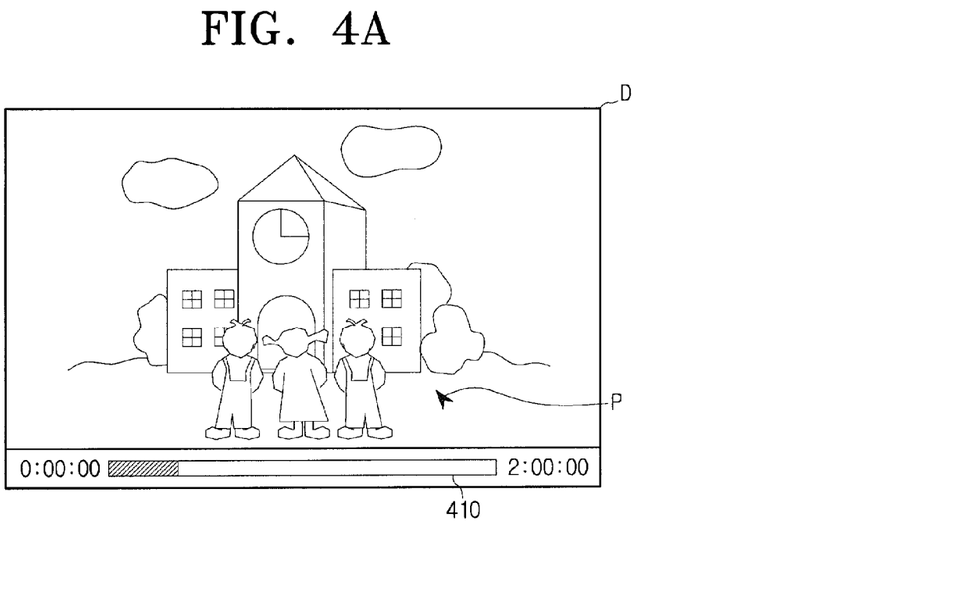
FIGS. 4A, 4B, 4C and 4D are views illustrating a method for providing a GUI for changing reproducing time point of FIG. 3.

FIG. 4A illustrates an example of the display D displaying the progress bar 410 and the pointer P according to operation S320. Referring to FIG. 4A, the progress bar 410 indicates a current reproducing time point by using two different colors. That is, a border line between the two colors on the progress bar 410 represents the current reproducing time point.

If specific time point is selected on the progress bar 410 by the pointer P (operation S325), and the controller 190 sets a specific time period which comprises the selected specific time (operation S330).

The selection at operation S325 is executed by moving the face of the remote control 200 relative to the VP so as to move the pointer P to point a specific time point on the progress bar 410, and then by pressing the select key on the key input unit 240 of the remote control 200.

The length of the specific time period set at operation S330 may be in proportion to the whole length of the moving image. For example, if the whole length of the moving image is one hour, then the length of the specific time period may be set to ten seconds, and if the whole length of the moving image is two hours, then the length of the specific time period may be set to twenty seconds.

The specific time point selected at operation S325 may be, for example, at the middle of the specific time period set at operation S330. Accordingly, if the whole length of the moving image is two hours and the selected specific time point is '1:00:00', then the specific time period may be '0:59:50~1:00:10'.

The controller 190 samples time points every M seconds in the set specific time period (operation S335). In the above example, if M is '2', then the time points sampled at operation S335 may be '0:59:50', '0:59:52', '0:59:54', ' . . . ', '1:00:06', '1:00:08', and '1:00:10'.

The controller 190 designates N time points among the sampled time points (operation S340). The N time points designated by the controller 190 may be, for example, the specific time point which is selected at operation S325 and the time point which is adjacent to the selected specific time point. That is, if N is '5', then the time points designated at operation S340 may be '0:59:56', '0:59:58', '1:00:00', '1:00:02', and '1:00:04'.

The controller 190 controls such that reduction images of the N time points are displayed on the upper side of the progress bar 140 (operation S345).

To process operation S345, the controller 190 1) controls the HDD controller 140 to read images of N time points from the HDD 150, 2) controls the image processor 160 to generate the reduction images of N images read by the HDD controller 140, and 3) controls the GUI generator 170 to combine N reduction images generated at the image processor 160 with a moving image displayed on the display D.

The controller 190 controls such that a connection line is provided, visually connecting the specific time points selected at operation S325 with N reduction images displayed at operation S345 (operation S350).

To process operation S350, the controller 190 generates the connection line connecting visually the specific time point with the N reduction images, and controls the GUI generator 170 to combine the generated connection line with a broadcast displayed on the display D.

Figure 4B:
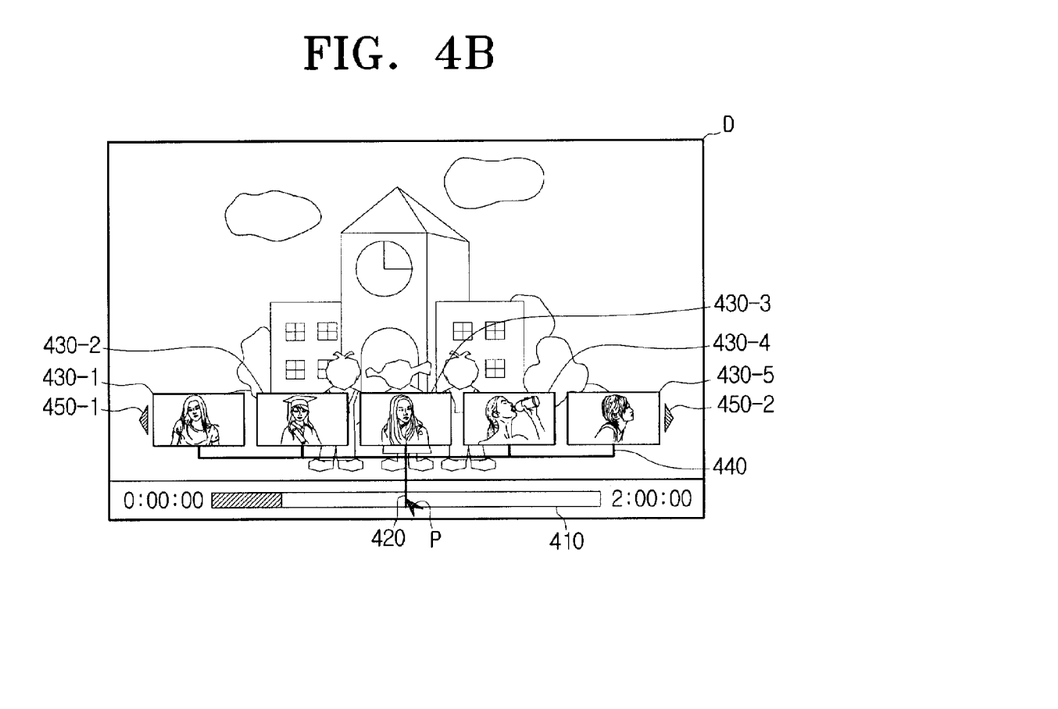

An example of the display D after processing operations S345 and S350, is illustrated in FIG. 4B. Referring to FIG. 4B, 1 N=5 reduction images 430-1, 430-2, 430-3, 430-4, and 430-5 on the upper side of the progress bar 410, and 2) a connection line 440 connecting visually the specific time point 420 with N=5 reduction images 430-1, 430-2, 430-3, 430-4, and 430-5, are displayed.

An icon "◄" 450-1 and an icon "►" 450-2 are displayed on the display D. These icons enable the user to call for other reduction images in the specific time period.

The icon "◄" 450-1 is used to input a command for calling for reduction images prior to the reduction images 430-1, 430-2, 430-3, 430-4, and 430-5 displayed on the display D, and the icon "►" 450-2 is used to input a command for calling for reduction images following the reduction images 430-1, 430-2, 430-3, 430-4, and 430-5 displayed on the display D.

If one of the reduction images 430-1, 430-2, 430-3, 430-4, and 430-5 is selected by the pointer P (operation S355=Y), then the controller 190 changes the current reproducing time point to the time point that the reduction image represents (operation S360).

Figure 4C:
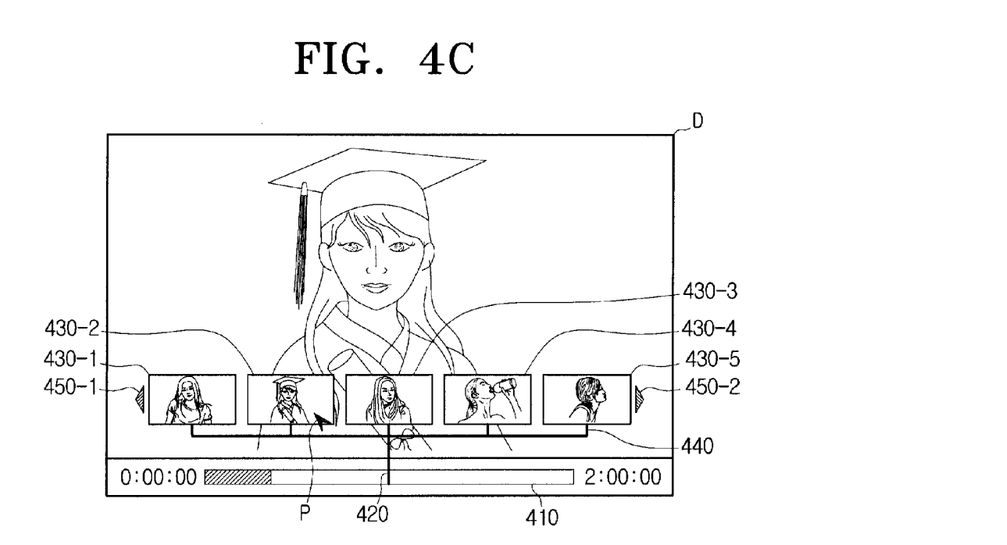

For example, if a second reduction image 430-2 is selected by the pointer P as illustrated in FIG. 4C, then the controller 190 controls the HDD controller 140 to reproduce the moving image from a time represented by the second reduction image 430-2.

The selection at operation S355 is executed by pressing the select key on the key input unit 240 of the remote control after a user manipulates to move the face of the remote control 200 relative to the VP such that the pointer P points to the desired reduction image.

If the icon "◄" 450-1 or the icon "►" 450-2 is selected by the pointer P (operation S365=Y), then the controller 190 controls to display reduction images prior to or following the reduction images displayed on the display D (operation S370).

Figure 4D:
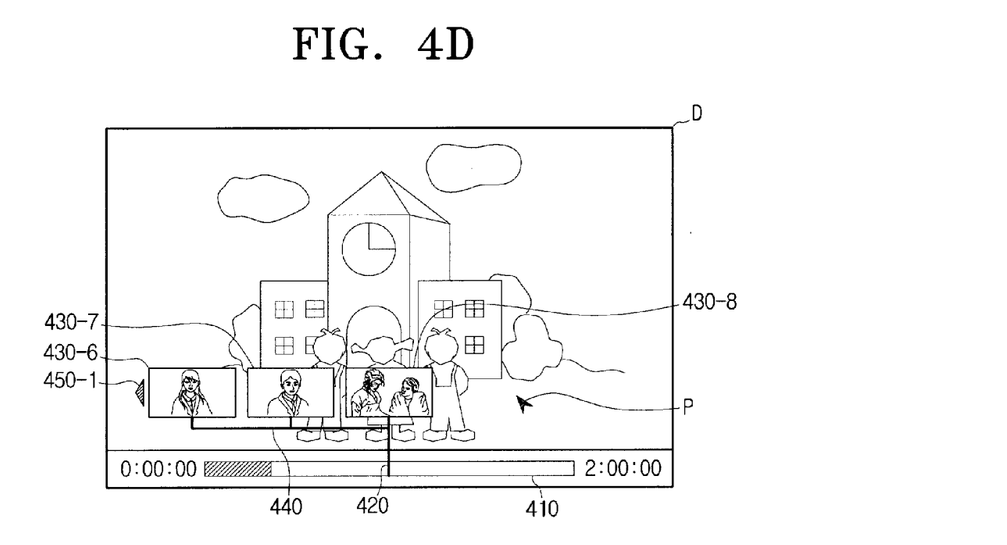

For example, if time point '1:00:04' is represented by 5th reduction image 430-5 illustrated in FIG. 4B, and if the icon "►" 450-2 is selected by the pointer P, then the controller 190 controls to display the reduction images 430-6, 430-7, and 430-8 poisoned at time points '1:00:06', '1:00:08', and '1:00:10' following '1:00:04' on the display D, as shown in FIG. 4D.

To process operation S370, the controller 190 1) controls the HDD controller 140 to read images of time points prior to or following the HDD 150, 2) controls the image processor 160 to generate the reduction images of the images read by the HDD controller 140, and 3) controls the GUI generator 170 to combine the reduction images generated at the image processor 160 with the moving image displayed on the display D.

While a moving image file is reproduced, a process of providing a GUI for changing a reproducing time point, and a process of changing the reproducing time point to the time point selected by user through the GUI, are explained above in detail with reference to the exemplary embodiments.

In the exemplary embodiments, a progress bar is explained as an example of a reproducing time point guiding graphic which indicates the current reproducing time point. However, the progress bar is merely an example of a reproducing time point guiding graphic, and it is possible to use other forms of guiding graphics.

According to exemplary embodiments described above, the length of the specific time period is in proportion to the whole length of moving image being reproduced, but a fixed length may be applied and this fixed length may be adjusted as necessary. If the fixed length is 20 seconds, for instance, then the length of a specific time period may be set to 20 seconds regardless of whenever the whole length of the moving image is 1 hour or 2 hours.

According to exemplary embodiments described above, the specific time point is positioned at the middle of the specific time period, but this is only an exemplary embodiment. Accordingly, the specific time point may be positioned at the beginning or ending of the specific time period, or another point during the time period.

According to an exemplary embodiment of the present invention, 'N' is the number of reduction images displayed at once on the display D. 'N' may be increased, by decreasing a scale of the reduction images. "N" may also be decreased, by increasing a scale of the reduction images.

According to exemplary embodiments described above, the time points are sampled at 'M'-second intervals within the specific time period, but it is possible to sample 'K' time points within the specific time period. 'K' may be the number of the reduction images displayable at once on the display D.

For example, if the number of the reduction image displayable at once on the display D is 5, and the specific time period is '0:59:50~10:00:10', then the time points to be sampled may be '0:59:52', '0:59:56', '1:0:00', '1:00:04', and '1:00:08'.

Consistent with the present invention, the reduction images may be displayed at another side instead of the upper side of the progress bar, and the connection line connecting visually the specific time point and the reduction images may be provided differently from the form illustrated in FIG. 4B.

According to exemplary embodiments described above, a case of providing a GUI to change the reproducing time is explained while reproducing moving image file from the HDD as a storage medium which is built-in to a TV. However, the present invention is also applicable to instances where a TV has other types of storage media.

Aspects of the present invention are applicable to a case of executing the time-shifting operation by TV, using a broadcast stored at a flash memory. The controller 190 may control the memory controller 120 instead of the HDD controller 140.

Although exemplary embodiments explained above have described the TV as an example of the broadcast receiving apparatus, the broadcast receiving apparatuses may also be implemented as a set top box (STB), a digital multimedia broadcast (DMB) receiving apparatus, and a portable apparatus with a built-in module for receiving a broadcast such as a mobile phone with a built-in module for receiving a DMB. In the case of such a portable apparatus, a pointer P may be moved by using a touch pad instead of a remote control, for example.

The present invention is applicable to any image apparatus capable of reproducing a moving image stored at the storage media, in addition to the broadcast receiving apparatus. Consistent with the present invention, a touch pad or a mouse may be used to move the pointer P instead of the remote control, according to a kind of the image apparatus in use.

Another exemplary embodiment of the present invention is described in detail with reference to FIGS. 5 and 6.

Figure 5:
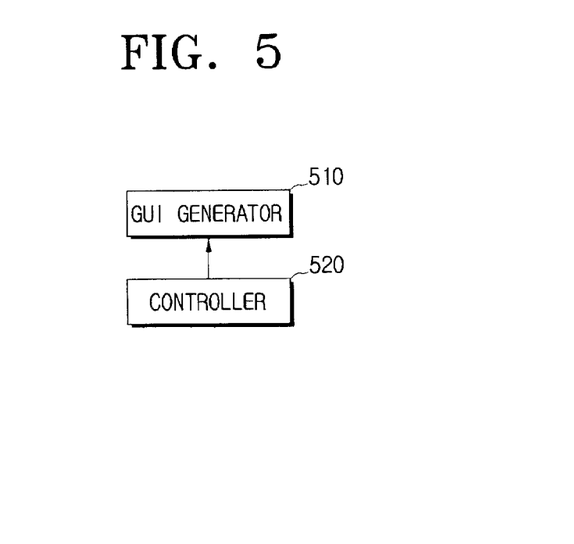
FIG. 5 is a block diagram of an image apparatus according to another exemplary embodiment of the present invention.

Referring to FIG. 5, an image apparatus according to another exemplary embodiment of the present invention comprises a GUI generator 510, and a controller 520. The GUI generator 510 generates a GUI and combines the generated GUI with an image to be displayed.

The controller 520 controls the GUI generator 510 to generate a reproducing time point guiding graphic, and a pointer P indicating the current reproducing time point, to combine with the displayed image. The controller 520 controls the GUI generator 510 so that, if a specific time point is selected from the reproducing time point guiding graphic by the pointer P, then the reduction images of a part of the time points within the specific time period comprising the specific time point are combined with the image to be displayed. The controller 520 then changes the current reproducing time point into the time point represented by the selected reduction image.

Figure 6:
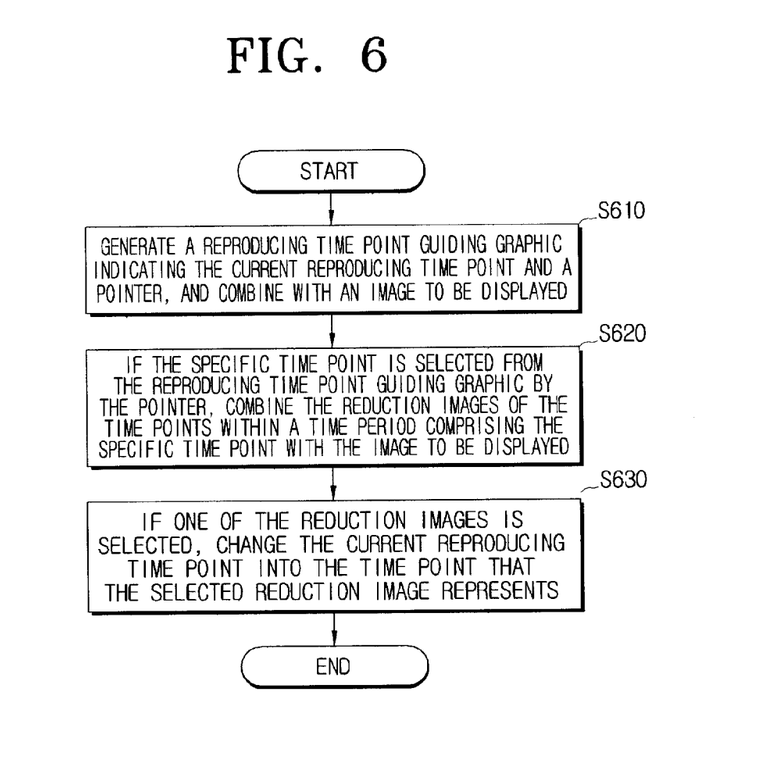
FIG. 6 is a flowchart explaining a method for providing a GUI for changing a reproducing time point according to another exemplary embodiment of the present invention.

According to the method for providing the GUI for changing the reproducing time point that is illustrated in FIG. 6, the controller 520 controls the GUI generator 510 to generate a reproducing time point guiding graphic and a pointer P indicating the current reproducing time point, and to combine the generated reproducing time point guiding graphic and pointer P with the image to be displayed (operation S610).

If the specific time point is selected from the reproducing time point guiding graphic by the pointer P, then the controller 520 controls the GUI generator 510 to combine the reduction images of a part of the time points within the specific time period comprising the specific time point with the image to be displayed (operation S620).

If one of the reduction images is selected, then the controller 520 changes the current reproducing time point to the time point that the selected reduction image represents (operation S630).

The GUI for changing the reproducing time point is provided, and the reproducing time point is changed to the time point selected by user through the GUI.

According to exemplary embodiments of the present invention as described above, the reduction images of time points positioned within a specific time period selected by the pointer P are displayed, and the reproducing time point may be changed to a selected time point as represented by the selected reduction image. Accordingly, the user is able to search a desired time point without going through a plurality of manipulations to change the reproducing time point by the pointer P on the progress bar.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A method of providing a Graphical User Interface (GUI) for changing a reproducing time point of a moving image, the method comprising:
   reproducing the moving image on a display;
   displaying a progress bar representing a reproduction time of the moving image;
   if a specific time point is selected on the progress bar by touch input, displaying a first image representing the specific time point of the moving image and displaying at least one second image representing a different time point of the moving image, wherein the different time point is different from the specific time point,
   if one of the first image and the at least one second image is selected by touch input, reproducing the moving image from a time point corresponding to the selected image.

2. The method of claim 1, further comprising displaying a connection line connecting the first image with the at least one second image.

3. The method of claim 1, wherein the different time point is within a specific time period comprising the selected specific time point.

4. The method of claim 3, wherein a length of the specific time period is proportional to a whole reproduction length of the moving image.

5. The method of claim 3, wherein the specific time period is determined such that the specific time point is positioned at one of a beginning, a middle, and an end of the specific time period.

6. The method of claim 1, wherein the different time point is a time point prior to or following the specific time point.

7. The method of claim 1, further comprising:
   displaying a pointer for selecting the specific time point.

8. The method of claim 1, wherein the first image and the at least one second image are overlapped on the moving image.

9. An imaging apparatus comprising:
   a display which reproduces a moving image and is configured to receive a touch input;
   a Graphical User Interface (GUI) generator which generates a progress bar representing a whole reproduction time of the moving image; and
   a controller which controls the display to display the progress bar with the moving image,
   wherein, if the specific time point is selected on the progress bar by touch input, the controller controls the display to display a first image representing the specific time point of the moving image and controls the display to display at least one second image representing a different time point of the moving image, wherein the different time point is different from the specific time point,
   wherein if one of the first image and the at least one second image is selected by touch input, the controller controls the display to reproduce the moving image from a time point corresponding to the selected image.

10. The imaging apparatus of claim 9, wherein the controller controls the display to display a connection line connecting the first image with the at least one second image.

11. The imaging apparatus of claim 9, wherein the different time point is within a specific time period comprising the selected specific time point.

12. The imaging apparatus of claim 11, wherein a length of the specific time period is proportional to the whole reproduction length of the moving image.

13. The imaging apparatus of claim 11, wherein the specific time period is determined such that the specific time point is positioned at one of a beginning, a middle, and an end of the specific time period.

14. The imaging apparatus of claim 9, wherein the different time point is a time point prior to or following the specific time point.

15. The imaging apparatus of claim 9, wherein the controller controls the display to display a pointer for selecting the specific time point.

16. The imaging apparatus of claim 9, wherein the controller controls the display to display the first image and the at least one second image as overlapped on the moving image.

* * * * *